(12) United States Patent
Nilsson

(10) Patent No.: US 10,673,587 B2
(45) Date of Patent: Jun. 2, 2020

(54) BEAM MANAGEMENT FOR A RADIO TRANSCEIVER DEVICE

(71) Applicant: Telefonaktiebolaget LM Ericsson (Publ), Stockholm (SE)

(72) Inventor: Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 15/760,811

(22) PCT Filed: Feb. 27, 2018

(86) PCT No.: PCT/EP2018/054793
§ 371 (c)(1),
(2) Date: Mar. 16, 2018

(87) PCT Pub. No.: WO2019/166073
PCT Pub. Date: Sep. 6, 2019

(65) Prior Publication Data
US 2019/0268117 A1    Aug. 29, 2019

(51) Int. Cl.
*H04B 17/00*  (2015.01)
*H04L 5/00*   (2006.01)
(Continued)

(52) U.S. Cl.
CPC ......... *H04L 5/0048* (2013.01); *H04B 7/0408* (2013.01); *H04B 7/0695* (2013.01);
(Continued)

(58) Field of Classification Search
CPC ...... H04B 7/088; H04B 7/318; H04B 7/0619; H04W 74/0833; H04W 24/10; H04W 72/14; H04W 56/001; H04W 76/28
See application file for complete search history.

(56) References Cited

U.S. PATENT DOCUMENTS 9,768,501 B2 *   9/2017  Maltsev ................... H01Q 3/36
2011/0110453 A1   5/2011  Prasad et al.
(Continued)

FOREIGN PATENT DOCUMENTS

WO    2017/194094 A1   11/2017
WO    2018/028579 A1    2/2018

OTHER PUBLICATIONS

International Search Report and Written Opinion issued in International Application No. PCT/EP2018/054793, dated Nov. 6, 2018, 16 pages.
(Continued)

*Primary Examiner* — Hanh N Nguyen
(74) *Attorney, Agent, or Firm* — Rothwell, Figg, Ernst & Manbeck, P.C.

(57) ABSTRACT

There is provided mechanisms for a radio transceiver device to participate in beam management. A method is performed by the radio transceiver device. The method comprises receiving a reference signal from another radio transceiver device as part of participating in the beam management. The reference signal occupies time/frequency resources that extend over a frequency interval. The reference signal is simultaneously received in a set of beams where each beam has a unique frequency dependent phase shift such that all beams in the set of beams point in mutually different directions and each beam covers its own part of the frequency interval.

24 Claims, 5 Drawing Sheets

(51) Int. Cl.
  *H04W 16/28* (2009.01)
  *H04W 72/04* (2009.01)
  *H04B 7/08* (2006.01)
  *H04B 7/0408* (2017.01)
  *H04B 7/06* (2006.01)

(52) U.S. Cl.
  CPC ........... *H04B 7/088* (2013.01); *H04B 7/0828* (2013.01); *H04W 16/28* (2013.01); *H04W 72/04* (2013.01)

(56) References Cited

U.S. PATENT DOCUMENTS

| | | | |
|---|---|---|---|
| 2018/0049245 A1* | 2/2018 | Islam | H04B 7/0619 |
| 2018/0262258 A1* | 9/2018 | Kumagai | H04B 7/088 |
| 2018/0331805 A1* | 11/2018 | Xia | H04L 5/0051 |
| 2018/0358695 A1* | 12/2018 | Athley | H04B 7/0617 |
| 2019/0074886 A1* | 3/2019 | Yoon | H04B 17/318 |
| 2019/0253119 A1* | 8/2019 | Lo | H04B 7/0695 |

OTHER PUBLICATIONS

3GPP TSG RAN WG1 Meeting #91, R1-1719533, Reno, USA, Nov. 27-Dec. 1, 2017, ZTE, Sanechips, "Discussion on beam management", 11 pages.

* cited by examiner

BEAM MANAGEMENT FOR A RADIO TRANSCEIVER DEVICE

CROSS REFERENCE TO RELATED APPLICATION(S)

This application is a 35 U.S.C. § 371 National Stage of International Patent Application No. PCT/EP2018/054793, filed Feb. 27, 2018, designating the United States, the disclosure of which is incorporated by reference.

TECHNICAL FIELD

Embodiments presented herein relate to a method, a radio transceiver device, a computer program, and a computer program product for participating in beam management.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the transmission and reception point (TRP) of the network node and/or the terminal devices) in order to increase coverage and throughput.

Due to the high penetration loss through objects and poor diffraction around object edges at higher frequency bands the link between the TRP and the terminal device will be sensitive to blocking. Blocking could occur either slowly/ gradually or very suddenly, depending on the speed of movement of the terminal device, and the motion of objects in the environment. The narrower the beams, the more chance there is for sudden blocking to occur. Thus, due to rotation, movement and/or blockage of the served terminal devices the beam (at the TRP and/or terminal devices) needs to be updated dynamically in order to maintain good channel quality between the network node and the served terminal devices.

In case an operative connection between a served terminal device and the network node is lost, for example due to radio propagation channel deterioration such as blocking, a beam recovery procedure can be initiated to re-establish the beam connection. Such a beam recovery procedure could, for example, involve beam training whereby all different combinations of beams, both at the network node and at the terminal device, are swept through. Beam training could thus be part of beam management. When there are many candidate beams such beam training could be costly in terms of time consumption and overhead signaling.

This could be especially challenging where the terminal device is configured for analog beamforming and thus only can sweep through its candidate beams sequentially one at a time.

As an illustrative example, consider a scenario with a network node at the network-end having a single antenna array with 4-by-8 (vertical-by-horizontal) antenna elements and a terminal device at the user-end having a single antenna array with 8-by-1 antenna elements. Furthermore, assume that beams should be selected from a beam grid obtained by a two-dimensional (one-dimensional at the terminal device) discrete Fourier transform (DFT) beamforming matrix. Then there will be 32 candidate beams at the network node and 8 candidate beams at the terminal device to select from. In general, without any restrictive assumptions, all possible combinations of beams at the network node and the terminal device need to be evaluated. This means that 32·8=256 different beam pairs need to be evaluated. If one beam per orthogonal frequency-division multiplexing (OFDM) symbol can be tested, this means that 256 OFDM symbols are required to perform an exhaustive beam search. This may be an unacceptable search time and amount of overhead.

Hence, there is still a need for an improved beam management.

SUMMARY

An object of embodiments herein is to provide efficient beam management where the above noted issues are resolved, or at least mitigated.

According to a first aspect there is presented a method for participating in beam management. The method is performed by a radio transceiver device. The method comprises receiving a reference signal from another radio transceiver device as part of participating in the beam management. The reference signal occupies time/frequency resources that extend over a frequency interval. The reference signal is simultaneously received in a set of beams where each beam has a unique frequency dependent phase shift such that all beams in the set of beams point in mutually different directions and each beam covers its own part of the frequency interval.

According to a second aspect there is presented a radio transceiver device for participating in beam management. The radio transceiver device comprises processing circuitry. The processing circuitry is configured to cause the radio transceiver device to receive a reference signal from another radio transceiver device as part of participating in the beam management. The reference signal occupies time/frequency resources that extend over a frequency interval. The reference signal is simultaneously received in a set of beams where each beam has a unique frequency dependent phase shift such that all beams in the set of beams point in mutually different directions and each beam covers its own part of the frequency interval.

According to a third aspect there is presented a radio transceiver device for participating in beam management. The radio transceiver device comprises a receive module configured to receive a reference signal from another radio transceiver device as part of participating in the beam management. The reference signal occupies time/frequency resources that extend over a frequency interval. The reference signal is simultaneously received in a set of beams where each beam has a unique frequency dependent phase shift such that all beams in the set of beams point in mutually different directions and each beam covers its own part of the frequency interval.

Advantageously this provides efficient beam management.

Advantageously this enables efficient beam management where the above noted issues are resolved, or at least mitigated.

Advantageously this enables the overhead signaling for beam management to be reduced, as compared to the overhead signaling for traditional beam management.

According to a fourth aspect there is presented a computer program for participating in beam management, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
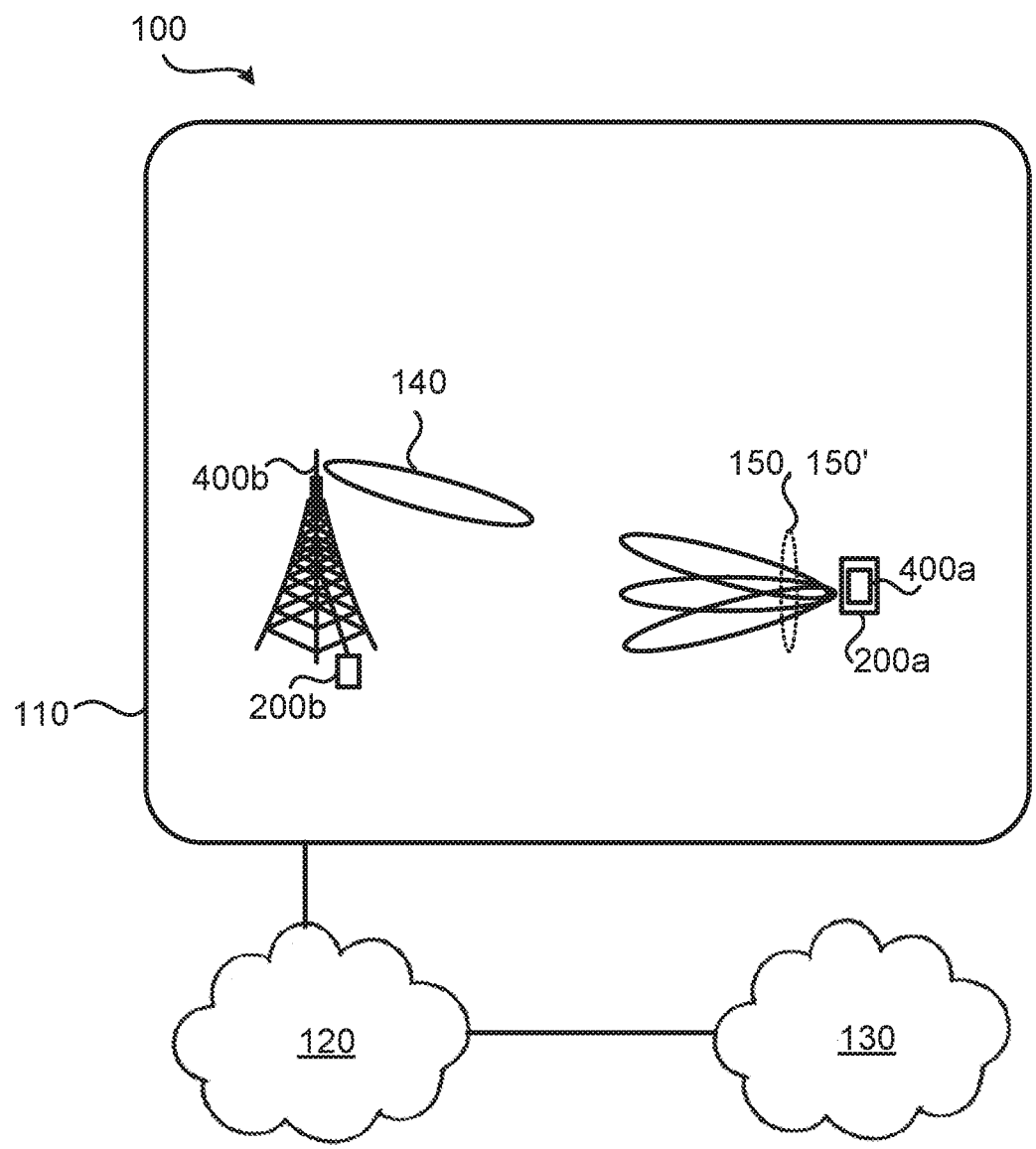
FIG. 1 is a schematic diagram illustrating a communications network according to embodiments.

FIG. 1 is a schematic diagram illustrating a communications network too where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device 200b configured to, via TRP 400b, provide network access to radio transceiver device 200a, comprising TRP 400a, in a radio access network 110. In some embodiments radio transceiver device 200a is part of, integrated with, or collocated with, a terminal device and radio transceiver device 200a is part of, integrated with, or collocated with, a network node.

Radio access network 110 is operatively connected to a core network 120. The core network 120 is in turn operatively connected to a service network 130, such as the Internet. Radio transceiver device 200a is thereby, via the TRP 400b and radio transceiver device 200a, enabled to access services of, and exchange data with, the service network 130.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device implemented both as a radio access network node and a terminal device, or even as a radio transceiver device implemented as a backhauling node or a sidelink node. Thus, although radio transceiver device 200b in at least some of the herein disclosed embodiments is described as being a network node and radio transceiver device 200a is described as being a terminal device, the functionality of the herein disclosed radio transceiver device 200b could equally be implemented in a terminal device, and vice versa for radio transceiver device 200a.

Radio transceiver device 200a is, via TRP 400a, configured to communicate with radio transceiver device 200b in beams 150, 150'. Further, radio transceiver device 200b is, via TRP 400b, configured to communicate with radio transceiver device 200a in at least one beam 140. Radio transceiver device 200a, 200b could be configured to communicate using a variety of beams having different shapes and widths, herein generally referred to as having different beam patterns.

As disclosed above a beam management procedure might be performed in order to determine which beams radio transceiver device 200a and radio transceiver device 200b should use. As further disclosed above, the beam management procedure disclosed above might result in some issues.

The embodiments disclosed herein therefore relate to mechanisms for participating in beam management. In order to obtain such mechanisms there is provided a radio transceiver device 200a, a method performed by radio transceiver device 200a, a computer program product comprising code, for example in the form of a computer program, that when run on a radio transceiver device 200a, causes radio transceiver device 200a to perform the method.

Figure 2:
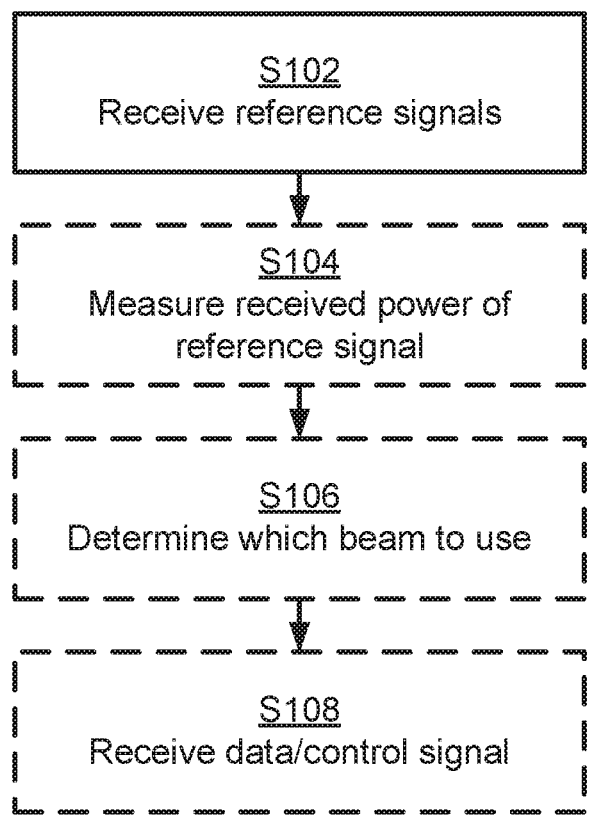
FIG. 2 is a flowchart of methods according to embodiments.

FIG. 2 is a flowchart illustrating embodiments of methods for participating in beam management. The methods are performed by radio transceiver device 200a. The methods are advantageously provided as computer programs 820.

It is assumed that radio transceiver device 200b transmits a reference signal that is received by transceiver device 200a. Hence, transceiver device 200a is to configured to perform step S102:

S102: Radio transceiver device 200a receives a reference signal. The reference signal is received from another radio transceiver device 200b. The reference signal is received as part of radio transceiver device 200a participating in the beam management. The reference signal occupies time/frequency resources. The time/frequency resources extend over a frequency interval. This frequency interval defines a bandwidth part (BWP), below denoted B, which is either the same, or smaller than, the full system bandwidth.

The reference signal is received in beams pointing in different directions for different parts of the frequency interval. Particularly, the reference signal is simultaneously received in a set of beams 150. In the set of beams 150 each beam has a unique frequency dependent phase shift. All beams in the set of beams 150 thereby point in mutually different directions and each beam covers its own part of the frequency interval.

This enables simultaneous reception in multiple (analog) beams during beam management procedures. As will be disclosed below, this does not have any impact on normal data or control signalling communications.

Embodiments relating to further details of for participating in beam management as performed by radio transceiver device 200a will now be disclosed.

In some aspects each beam covers a part of the frequency interval corresponding to a sub-carrier.

Figure 3:
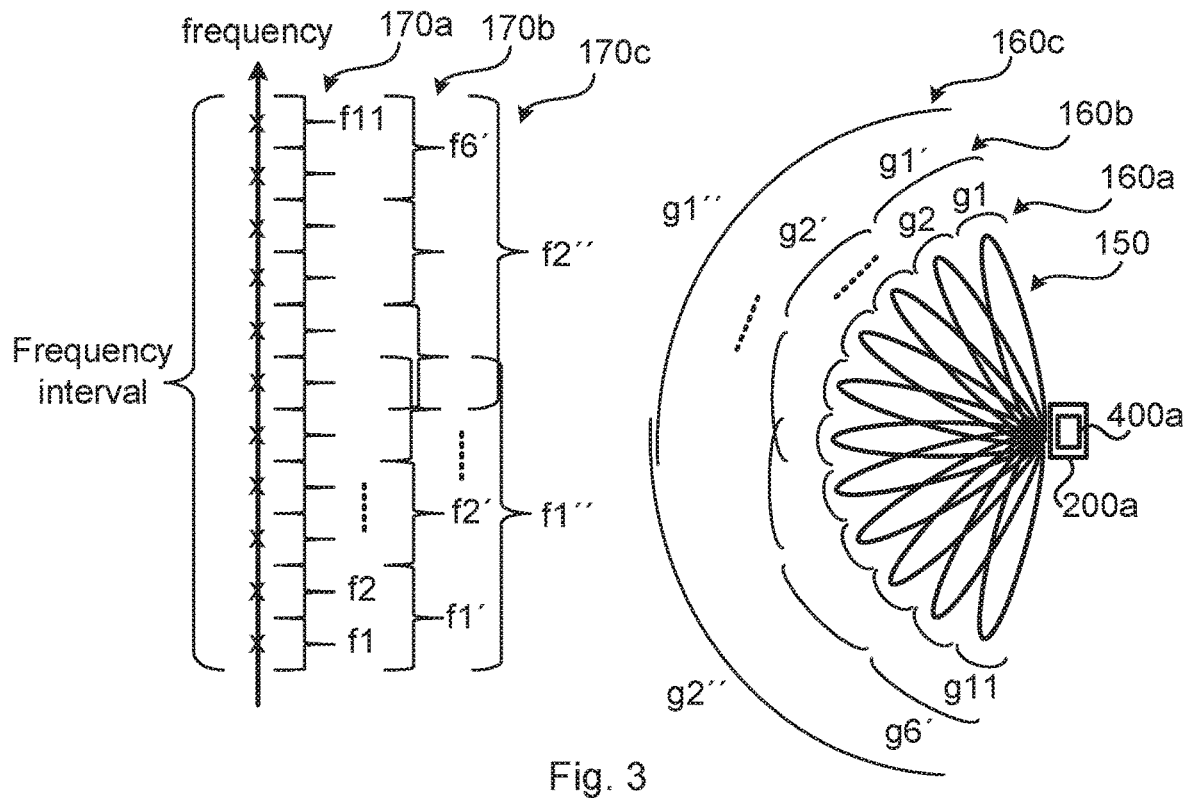
FIG. 3 schematically illustrates groupings of beams and frequency bands according to an embodiment.

Parallel reference is now made to FIG. 3. FIG. 3 schematically illustrates how multiple beams point in different direction for different parts of the frequency interval. In the illustrative example of FIG. 3 there are 11 beams and the frequency interval is divided into 11 frequency bands (where, for example, each frequency band, and thus each beam, corresponds to one sub-carrier).

FIG. 3 on the right-hand side schematically illustrates different groupings 160a, 160b, 160c of the beams in a set of beams 150 generated at radio transceiver device 200a.

Particularly, according to an embodiment the beams are divided into groups of adjacent beams. In this respect, according to the illustrative example in FIG. 3 there are three examples of how the beams might be divided into groups of adjacent beams. In a first example, as defined by grouping 160a, the beams are grouped into groups g1, g2, ..., g11. Each group g1, g2, ..., g11 in FIG. 3 thus consists of a single beam. In a second example, as defined by grouping 160b, the beams are grouped into groups g1', g2', ..., g6'. Each group g1', g2', ..., g6' in FIG. 3 thus consists of two adjacent beams. In a third example, as defined by grouping 160c, the beams are grouped into groups g1", g2". Each group g1", g2" in FIG. 3 thus consists of one half of the beams.

Further in this respect, the groups might either be non-overlapping or partly overlapping. In the grouping 160a, all groups g1, g2, ..., g11 are non-overlapping. In the grouping 160b, two groups are partly overlapping (both comprising the middle-most beam) whilst the remaining four groups are non-overlapping. In the grouping 160c the two groups g1", g2" both comprise the middle-most beam and are hence partly-overlapping.

There could be different ways to determine how to divide the beams into the groups of adjacent beams. In some aspects radio transceiver device 200a has preconfigured a set of frequency bands, where each frequency bands is defined by a group of beams, and measures received power (as in optional step S104 below) over each of these predefined frequency bands, and then selects the frequency band (or corresponding group) that had the highest average received power. In other aspects embodiment radio transceiver device 200a selects the parts of the frequency band (and thus which grouping to use, if any) dynamically during the beam management procedure. Thus, according to an embodiment, how to divide the beams into the groups of adjacent beams is either preconfigured in radio transceiver device 200a or dynamically configurable by radio transceiver device 200a.

FIG. 3 on the left-hand side schematically illustrates different groupings 170a, 170b, 170c of frequency bands. The groupings 170a, 170b, 170c of frequency bands correspond to the different groupings 160a, 160b, 160c of adjacent beams. According to an embodiment each group g1, g2, ..., g11, g1', g2', ..., g6', g1", and g2" thus corresponds to a respective frequency band f1, f2, ..., f11, f1', f2', ..., f6', f1", and f2". That is, group g1 corresponds to frequency band f1, group g2 corresponds to frequency band f2, and so on. In other words, each group of beams comprises beams spanning the frequency content of its corresponding frequency band.

In some aspects radio transceiver device 200a performs measurement of received power in each beam. Particularly, according to an embodiment radio transceiver device 200a is configured to perform (optional) step S104:

S104: Radio transceiver device 200a measures received power of the reference signal in each beam.

During the beam management, radio transceiver device 200a is thus enabled to measure received power over the whole frequency interval.

Radio transceiver device 200a is further enabled to determine which part of the frequency interval that has the highest received power. Particularly, according to an embodiment one received power value is determined per group from all individual measurements of received power for the beams in that group. This one received power value per group could be determined by averaging the received power for all beams in the group. Further, if different groups span different frequency widths, the one received power value per group could be determined by averaging the received power for all beams in the group over the frequency width for that group.

In some aspects radio transceiver device 200a based on the measured received power determines a preferred beam to be used during coming data and/or control signalling with radio transceiver device 200b.

Particularly, according to an embodiment the reference signal is received in a set of beams denoted a first set of beams 150 and radio transceiver device 200a is configured to perform (optional) step S106:

S106: Radio transceiver device 200a determines which beam from a second set of beams 150' to use for receiving subsequent data and/or a control signalling from radio transceiver device 200b based on in which group of beams, or individual beam, in the first set of beams 150 the reference signal was received with highest received power.

Hence, radio transceiver device 200a only needs to receive one OFDM symbol to evaluate all possible beams, which will save a lot of overhead signaling. That is, according to an embodiment the reference signal is composed of a single reference signal resource and is provided in one single OFDM symbol.

In some aspects, for certain parts of the frequency interval the frequency content of the beam will vary slightly within that part of the frequency interval. Therefore, in some aspects, in each group the beam corresponding to a certain part of the frequency interval is the beam that corresponds to the center frequency of that part of the frequency interval.

Each beam in the first set of beams 150 could have a beam index. It could also be that each group of beams is represented by a beam index. This beam index could then correspond to the beam at the center frequency in the group of beams.

There could be different numbers of beams in the first set of beams 150 and in the second set of beams 150'. That is, there might be more beams in which the reference signal is received than can be selected for receiving the subsequent data and/or a control signalling from radio transceiver device 200b. Particularly, according to an embodiment there are more beams in the first set of beams 150 than in the second set of beams 150', and determining which beam to use (in step S106) then involves mapping a beam index of the beam in which the reference signal was received with highest received power to a beam in the second set of beams 150'. As an illustrative example, assuming that there are 1024 beams in which the reference signal is received in step S102 and that the received power was strongest for the beam having beam index 96 in the first group of beams 150 (or the group with strongest received power where the beam with beam index 96 was at the center frequency in that group), then the beam in the second set of beams 150' is selected as the one being mapped from the beam index 96.

In some aspects the determined beam is then used during reception of data and/or control signalling. Particularly, according to an embodiment radio transceiver device 200a is configured to perform (optional) step S108:

S108: Radio transceiver device 200a receives data and/or a control signal from radio transceiver device 200b in the determined beam.

In some aspects the determined beam in the second set of beams 150' is also used for transmission of data and/or a control signalling.

There could be different ways to cause the beams to have mutually unique frequency dependent phase shifts. According to an embodiment reception of the reference signal at any adjacent antenna elements 420a, 420b, ..., 420N of the antenna array 440 differ by a time delay value τ, where the time delay value τ causes the beams to have mutually unique frequency dependent phase shifts. There could be different ways to determine the time delay value τ. In some aspects, the relation between the phase shift β over the bandwidth for two adjacent antenna elements, the bandwidth B and the required time offset τ is given by:

$$\beta = 2\pi \cdot B \cdot \tau$$

Hence, according to an embodiment the time delay value τ is determined according to $\tau = \beta/(2\pi \cdot B)$, where B is the frequency interval in Herz, and β is total phase shift in radians over the frequency interval B. As disclosed, above, in some aspects the frequency interval B is a BWP.

A phase shift of $2\pi$ over the entire frequency interval between two adjacent antenna elements in the antenna array will result in all possible beam pointing directions for the generated frequency selective beams. Therefore, according to an embodiment, $\beta \geq 2\pi$.

In some aspects the time delay is made so long that beams with substantially the same pointing direction are recurring several times within the full scheduled bandwidth. This is realistic especially if the bandwidth is several hundreds of MHz, as is expected at mmWave frequencies. In this way a more reliable preferred beam can be determined, since the received power of the reference signal in beams having substantially the same pointing direction can be measured at many different frequencies, and hence mitigate the effect of frequency selective fading.

Figure 4:
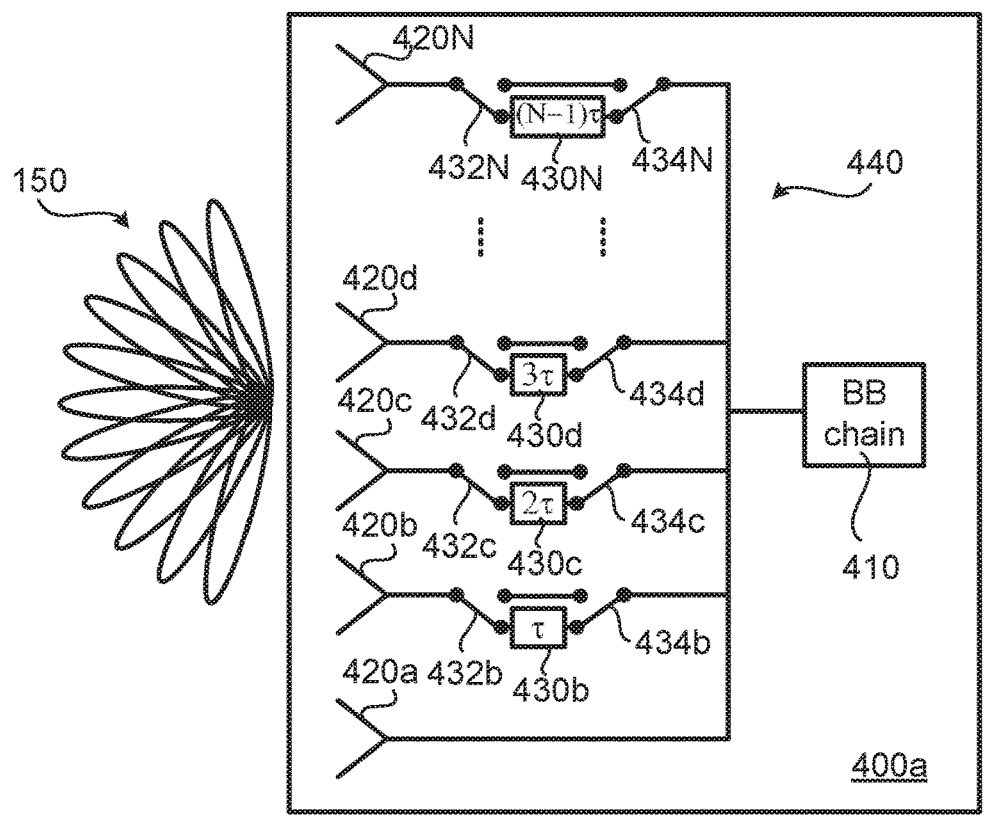
FIG. 4 schematically illustrates components of a TRP of a radio transceiver device according to an embodiment.

Reference is now made to FIG. 4. FIG. 4 schematically illustrates components of the TRP 400a of radio transceiver device 200a. The TRP 400 comprises an antenna array 440. The antenna array 440 comprises N≥2 antenna elements 420a, 420b, ..., 420N and is coupled to a baseband chain 410. Particularly, according to an embodiment the reference signal is received using an antenna array 440 comprising at least two antenna elements 420a, 420b, ..., 420N, where all antenna elements 420a, 420b, ..., 420N of the antenna array 440 are coupled to a single baseband chain 410. Further, according to an embodiment the reference signal is received using analog beamforming. Hence, the antenna array 440 might comprise an analog distribution network. There could be different types of the antenna elements. According to an embodiment all the antenna elements 420a, 420b, ..., 420N are single-polarized and have one and the same polarization.

According to an embodiment the time delay value τ is implemented in a time delay component 430b, 430c, ..., 430N. One time delay component 430b, 430c, ..., 430N is operatively connected between the baseband chain 410 and each but one of the antenna elements 420a, 420b, ..., 420N. The time shift created by the time delay component 430b, 430c, ..., 430N will result in a frequency dependent phase offset between the antenna elements 420a, 420b, ..., 420N of the antenna array 440. Examples of components that can be used to implement the time delay component 430b, 430c, ..., 430N are delay lines based on bulk acoustic waves (BAWs) or surface acoustic waves (SAWs) techniques.

In the illustrative example of FIG. 4, 100 all but antenna element 420a in the antenna array 440 is coupled a respective time delay component 430b, 430c, ..., 430N. Particularly, according to an embodiment the antenna array 440 comprises N antenna elements 420a, 420b, ..., 420N, where N≥2, and one time delay component 430b, 430c, ..., 430N is operatively connected between the baseband chain 410 and each of all but one of the antenna elements 420a, 420b, ..., 420N.

All these time delay components 430b, 430c, ..., 430N do not have the same time delay values. Particularly, according to an embodiment the time delay component 430b, 430c, ..., 430N for antenna element k, where k=2, ..., N, has time delay value $(k-1) \cdot \tau$.

For example, a bandwidth B of 100 MHz and a phase shift of $2\pi$ require a time offset of 0.01 μs, corresponding to approximately 1% of the cyclic prefix assuming a scale factor of five compared to the one used in Long Term Evolution (LTE) communications systems. For the time delay component with the largest required true time delay in FIG. 4 (the top component 430N with true time delay $(N-1)\cdot\tau$) this corresponds to (N−1) percent of the cyclic prefix.

In the illustrative example of FIG. 4, each time delay component 430b, 430c, ..., 430N can be connected to, and disconnected from, the antenna array 440 by means of a respective pair of switches 432b, 432c, 432d, ..., 432N, 434b, 434c, 434d, ..., 434N. Switches are one way of enabling the time delay component 430b, 430c, ..., 430N to be connected to, and disconnected from, the antenna array 440 as needed. For example, during a beam management procedure all the time delay component 430b, 430c, ..., 430N are switched to connected mode (i.e. all the switches 432b, 432c, 432d, ..., 432N, 434b, 434c, 434d, ..., 434N are set such that any signal passed between the baseband chain 410 and the antenna elements 420a, 420b, ..., 420N goes through a respective one of the time delay components 430b, 430c, ..., 430N), whereas when beam management is not performed all the time delay component 430b, 430c, ..., 430N are switched to disconnected mode (i.e. all the switches 432b, 432c, 432d, ..., 432N, 434b, 434c, 434d, ..., 434N are set such that the any signal passed between the baseband chain 410 and the antenna elements 420a, 420b, ..., 420N does not goes through any of the time delay components 430b, 430c, ..., 430N). Particularly, according to an embodiment the time delay component 430b, 430c, ..., 430N is not connected to the antenna elements 420a, 420b, ..., 420N when the data and/or control signal is received.

There could be different types of reference signals. Which reference signal to transmit (and hence for radio transceiver device 200a to receive) might depend on which type of radio transceiver device 200b is transmitting the reference signal.

According to an embodiment the reference signal is a CSI-RS, or is defined by a synchronization signal (SS) block. This could be a typical case where radio transceiver device 200b is a network node and radio transceiver device 200a is a terminal device.

For example, although the herein disclosed embodiments have related to a scenario for a reception beam sweep at radio transceiver device 200a (without radio transceiver device 200a needing to perform such a beam sweep), the herein disclosed embodiments can also be applied at scenarios for a transmit beam sweep at radio transceiver device 200b, where radio transceiver device 200b transmits one occurrence of the reference signal per transmit beam. In such scenarios radio transceiver device 200a will automatically find a reception beam for every transmit beam without any extra overhead signaling, which means a combined transmit and reception beam sweep can be performed at the cost of only a transmit beam sweep at radio transceiver device 200b.

According to an embodiment the reference signal is a sounding reference signal (SRS). This could be a typical case where radio transceiver device 200b is a terminal device and radio transceiver device 200a is a network node.

Figure 5:
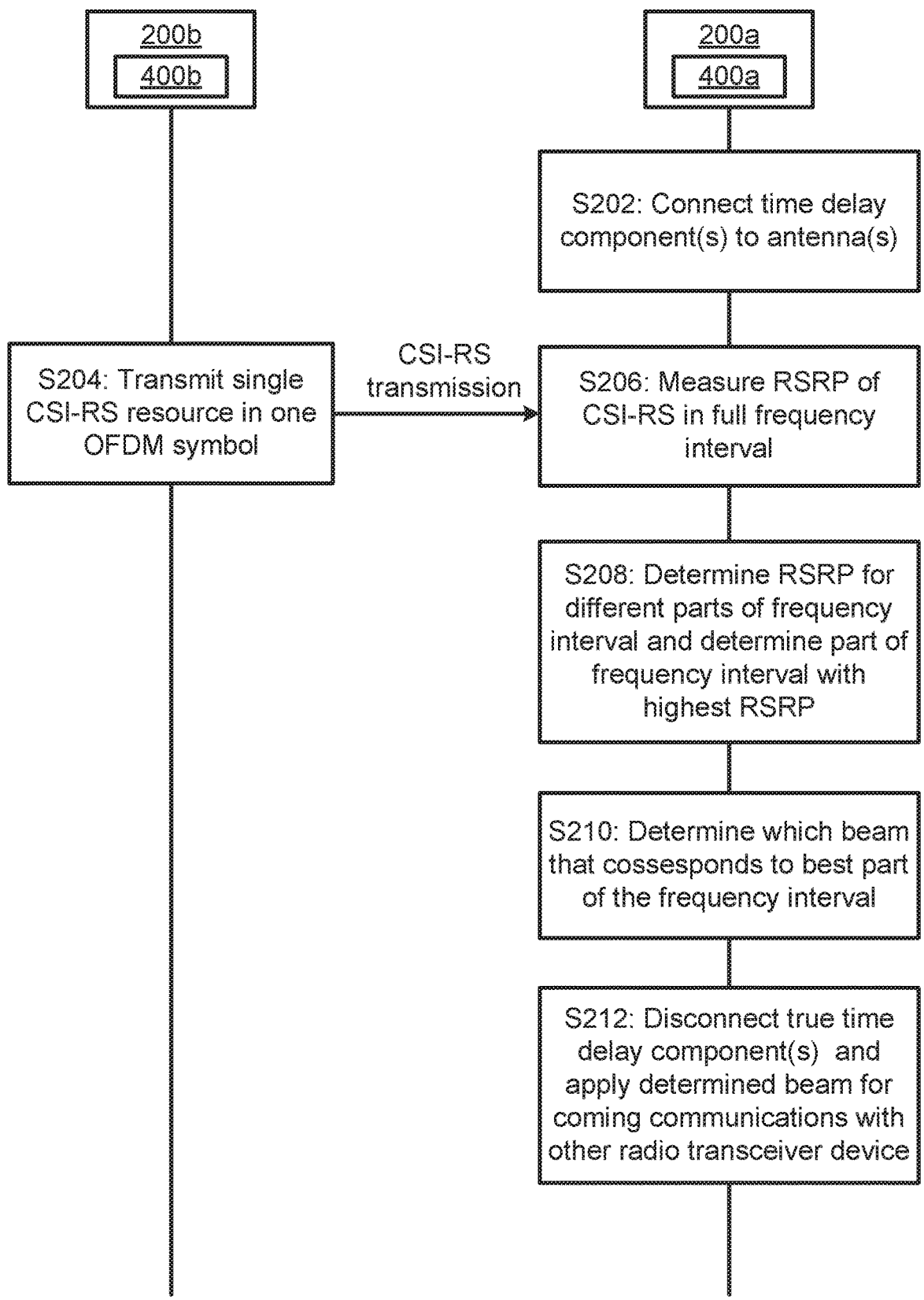
FIG. 5 is a signalling diagram according to an embodiment.

Reference is now made to FIG. 5. FIG. 5 is a signalling diagram of a method for beam management as performed by radio transceiver device 200a acting as a terminal device and radio transceiver device 200b acting as a network node.

S202: Before radio transceiver device 200a receives the reference signal resource radio transceiver device 200a has switched to connected mode for the time delay components 430b, 430c, ..., 430N.

S204: Radio transceiver device 200b transmits a single reference signal (by means of a CSI-RS) resource in one OFDM symbol.

S206: Radio transceiver device 200a receives the reference signal and measures received power (by means of RSRP) of the reference signal over the full frequency interval by simultaneously receiving the reference signal in a set of beams 150 where each beam has a unique frequency dependent phase shift such that all beams in the set of beams 150 point in mutually different directions and each beam covers its own part of the frequency interval. One way to implement step S206 is to perform steps S102 and S104.

S208: Radio transceiver device 200a then determines for which part of the frequency interval that the received power is strongest by determining the beam in the first set of beams 150 in which the reference signal was received with highest received power (or highest received power per frequency). One way to implement step S208 is to perform step S106.

S210: Radio transceiver device 200a determines which beam in the second set of beams 150' that corresponds to the beam in the first set of beams 150. One way to implement step S210 is to perform step S106.

S212: Radio transceiver device 200a switches back to disconnected mode and applies the determined beam for the whole frequency interval for coming communications with radio transceiver device 200b. One way to implement step S212 is to perform step S108.

Figure 6:
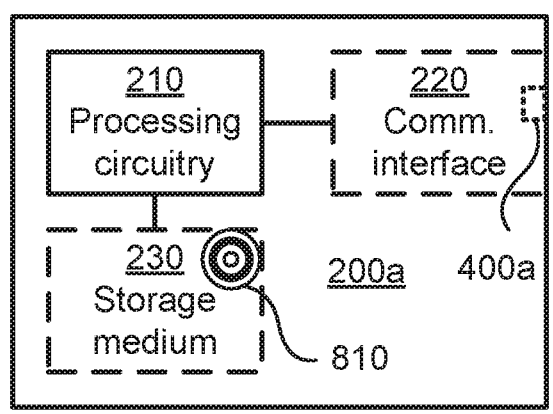
FIG. 6 is a schematic diagram showing functional units of a radio transceiver device according to an embodiment.

FIG. 6 schematically illustrates, in terms of a number of functional units, the components of a radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200a to perform a set of operations, or steps, as disclosed above. For example, the storage medium 230 may store the set of operations, and the processing circuitry 210 may be configured to retrieve the set of operations from the storage medium 230 to cause radio transceiver device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Radio transceiver device 200a may further comprise a communications interface 220 at least configured for communications with another radio transceiver device 200b. As such the communications interface 220 may comprise one or more transmitters and receivers, comprising analogue and digital components.

Signals, such as reference signals as well as data and control signals, could be transmitted from, and received by, a TRP 400a of radio transceiver device 200a. The TRP 400a could form an integral part of radio transceiver device 200a or be physically separated from radio transceiver device 200a. The communications interface 220 might thus optionally comprise the TRP 400a.

The processing circuitry 210 controls the general operation of radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200a are omitted in order not to obscure the concepts presented herein.

Figure 7:
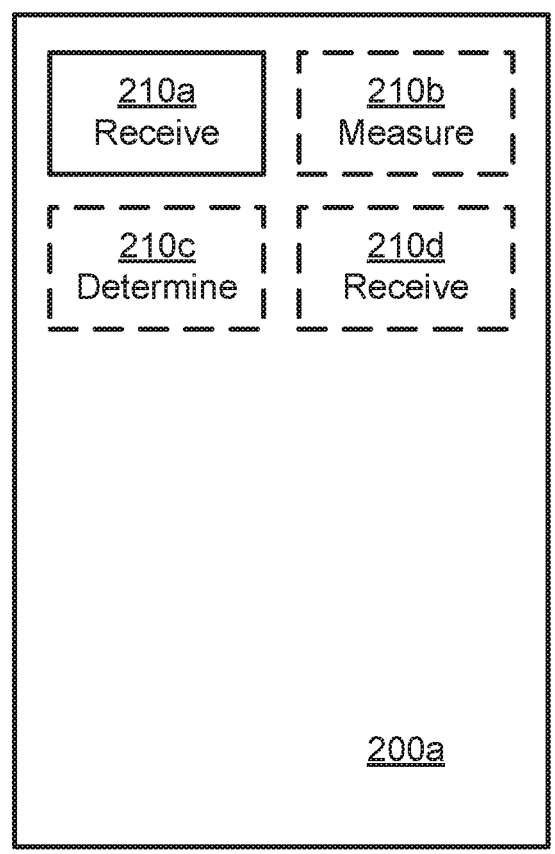
FIG. 7 is a schematic diagram showing functional modules of a radio transceiver device according to an embodiment.

FIG. 7 schematically illustrates, in terms of a number of functional modules, the components of a radio transceiver device 200a according to an embodiment. Radio transceiver device 200a of FIG. 7 comprises a receive module 210a configured to perform step S102. Radio transceiver device 200a of FIG. 7 may further comprise a number of optional functional modules, such as any of a measure module 210b configured to perform step S104, a determine module 210c configured to perform step S106, and a receive module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes radio transceiver device 200a perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

Radio transceiver device 200a may be provided as a standalone device or as a part of at least one further device. Examples of devices in which the functionality of radio transceiver device 200a might be provided have been given above with reference to FIG. 1.

A first portion of the instructions performed by radio transceiver device 200a may be executed in a first device, and a second portion of the of the instructions performed by radio transceiver device 200a may be executed in a second device; the herein disclosed embodiments are not limited to any particular number of devices on which the instructions performed by radio transceiver device 200a may be executed. Hence, the methods according to the herein disclosed embodiments are suitable to be performed by a radio transceiver device 200a residing in a cloud computational environment. Therefore, although a single processing circuitry 210 is illustrated in FIG. 6 the processing circuitry 210 may be distributed among a plurality of devices, or nodes. The same applies to the functional modules 210a-210d of FIG. 7 and the computer program 820 of FIG. 8 (see below).

Figure 8:
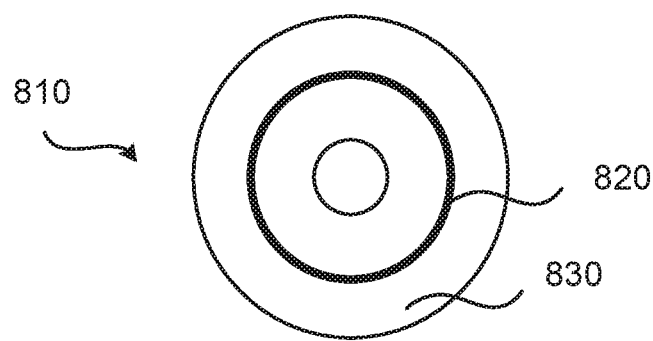
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for participating in beam management, the method being performed by a terminal device, the method comprising:
   receiving a reference signal from a radio transceiver device as part of participating in the beam management, wherein the reference signal occupies frequency resources that extend over a frequency interval, wherein
   receiving the reference signal comprises simultaneously receiving the reference signal in a set of at least two beams at the terminal device, the set of at least two beams at the terminal device comprising a first beam at the terminal device and a second beam at the terminal device, wherein each beam in the set of beams has a unique frequency dependent phase shift such that all beams in the set of beams point in mutually different directions and each beam covers its own part of the frequency interval, and
   simultaneously receiving the reference signal in the set of beams comprises:
   using the first beam at the terminal device to receive the reference signal, the first beam having a first frequency dependent phase shift; and
   at the same time as the first beam at the terminal device is used to receive the reference signal, using the second beam at the terminal device to receive the reference signal, the second beam having a second frequency dependent phase shift that is different than the first frequency dependent phase shift.

2. The method according to claim 1, wherein each beam covers a part of the frequency interval corresponding to a sub-carrier.

3. The method according to claim 1, further comprising:
   measuring received power of the reference signal in each beam.

4. The method according to claim 3, wherein the beams are divided into groups (g1, g2, . . . , g1', g2', . . . , g1", g2") of adjacent beams, where each group (g1, g2, . . . , g1', g2', . . . , g1", g2") corresponds to a frequency band (f1, f2, . . . , f1', f2', . . . , f1", f2"), and wherein one received power value is determined per group from all individual measurements of received power for the beams in that group.

5. The method according to claim 4, wherein how to divide the beams into the groups (g1, g2, . . . , g1', g2', . . . , g1", g2") of adjacent beams is either preconfigured in the terminal device or dynamically configurable by the terminal device.

6. The method according to claim 4, wherein
said set of at least two beams is a first set of beams, and the method further comprises determining a beam from a second set of beams to use for subsequent signaling from said radio transceiver device based on the group (g1, g2, . . . , g1', g2', . . . , g1", g2") of beams associated with highest received power value.

7. The method according to claim 6, wherein there are more beams in the first set of beams than in the second set of beams, and wherein determining which beam to use involves mapping a beam index of the beam in which the reference signal was received with highest received power to a beam in the second set of beams.

8. The method according to claim 6, further comprising:
receiving a data signal or a control signal from said radio transceiver device in the determined beam.

9. The method according to claim 8, wherein
the reference signal is received using an antenna array comprising at least two antenna elements, wherein all antenna elements of the antenna array are coupled to a single baseband chain, and
no time delay circuit is connected to any of the antenna elements when the data signal or the control signal is received.

10. The method according to claim 1, wherein the reference signal is received using an antenna array comprising at least two antenna elements, wherein all antenna elements of the antenna array are coupled to a single baseband chain.

11. The method according to claim 10, wherein reception of the reference signal at any adjacent antenna elements of the antenna array differ by a time delay value $\tau$, the time delay value $\tau$ causing the beams to have mutually unique frequency dependent phase shifts.

12. The method according to claim 11, wherein the time delay value $\tau$ is determined according to $\tau=\beta/(2\pi \cdot B)$ where B is the frequency interval in Herz, and $\beta$ is total phase shift in radians over the frequency interval B.

13. The method according to claim 12, wherein $\beta \geq 2\pi$.

14. The method according to claim 11, wherein the time delay value $\tau$ is implemented in a time delay circuit operatively connected between the baseband chain and one of the antenna elements.

15. The method according to claim 11, wherein the antenna array comprises N antenna elements, where N >2, and wherein one time delay circuit is operatively connected between the baseband chain and each of all but one of the antenna elements.

16. The method according to claim 15, wherein the time delay circuit for antenna element k, where k =2, . . . , N, has time delay value $(k-1)\cdot\tau$.

17. The method according to claim 10, wherein all the antenna elements are single-polarized and have one and the same polarization.

18. The method according to claim 1, wherein the reference signal is received using analog beamforming.

19. The method according to claim 1, wherein the reference signal is composed of a single reference signal resource and is provided in one single OFDM symbol.

20. The method according to claim 1, wherein the reference signal is a channel state information reference signal, or is defined by a synchronization signal, SS, block.

21. A computer program product comprising a non-transitory computer readable medium storing a computer program, the computer program comprising computer code which, when run on processing circuitry of the terminal device, causes the terminal device to perform the method of claim 1.

22. A first radio transceiver device for participating in beam management, the first radio transceiver device comprising processing circuitry, the processing circuitry being configured to cause the first radio transceiver device to:
use a first beam at the first radio transceiver device to receive a reference signal transmitted by a second radio transceiver device; and
at the same time as the first beam at the first radio transceiver device is used to receive the reference signal, use a second beam at the first radio transceiver device to receive the reference signal, wherein
the reference signal occupies frequency resources that extend over a frequency interval,
the first beam has a first frequency dependent phase shift, and
the second beam has a second frequency dependent phase shift that is different than the first frequency dependent phase shift.

23. The first radio transceiver device according to claim 22, wherein, the processing circuitry is further configured to cause the first radio transceiver device to measure received power of the reference signal in each beam, wherein
the first and second beams are included in a set of beams, and
the beams are divided into groups (g1, g2, . . . , g1', g2', . . . , g1", g2") of adjacent beams, where each group (g1, g2, . . . , g1', g2', . . . , g1", g2") corresponds to a frequency band (f1, f2, . . . , f1', f2', . . . , f1", f2"), and wherein one received power value is determined per group from all individual measurements of received power for the beams in that group.

24. A first radio transceiver device for participating in beam management, the first radio transceiver device comprising a receive module, wherein the receive module is configured to:
use a first beam at the first radio transceiver device to receive a reference signal transmitted by a second radio transceiver device; and
at the same time as the first beam at the first radio transceiver device is used to receive the reference signal, use a second beam at the first radio transceiver device to receive the reference signal, wherein
the reference signal occupies frequency resources that extend over a frequency interval,
the first beam has a first frequency dependent phase shift, and
the second beam has a second frequency dependent phase shift that is different than the first frequency dependent phase shift.

* * * * *